(12) United States Patent
Saurber, III et al.

(10) Patent No.: US 10,926,963 B1
(45) Date of Patent: Feb. 23, 2021

(54) SWITCH ASSEMBLY OF A SORTATION CONVEYOR

(71) Applicant: INTELLIGRATED HEADQUARTERS, LLC, Mason, OH (US)

(72) Inventors: William M. Saurber, III, Hamilton, OH (US); Jacob Wieneke, Liberty Township, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/594,758

(22) Filed: Oct. 7, 2019

(51) Int. Cl.
| B65G 47/71 | (2006.01) |
| B65G 47/66 | (2006.01) |
| B65G 47/76 | (2006.01) |
| B65G 47/82 | (2006.01) |
| B65G 47/68 | (2006.01) |

(52) U.S. Cl.
CPC ............. *B65G 47/71* (2013.01); *B65G 47/66* (2013.01); *B65G 47/68* (2013.01); *B65G 47/766* (2013.01); *B65G 47/82* (2013.01); *B65G 2207/36* (2013.01); *B65G 2811/0657* (2013.01); *B65G 2811/0678* (2013.01)

(58) Field of Classification Search
CPC ........ B65G 47/66; B65G 47/71; B65G 47/82; B65G 47/766; B65G 47/68
See application file for complete search history.

(56) References Cited

U.S. PATENT DOCUMENTS

| 4,738,347 | A | | 4/1988 | Brouwer et al. | |
| 4,884,677 | A | * | 12/1989 | Yu | B65G 47/844 |
| | | | | | 198/370.02 |
| 5,038,912 | A | | 8/1991 | Cotter | |
| 9,795,995 | B2 | * | 10/2017 | Zimmer | B65G 47/844 |
| 2008/0149459 | A1 | * | 6/2008 | Neiser | B65G 47/34 |
| | | | | | 198/370.02 |

* cited by examiner

*Primary Examiner* — Gene O Crawford
*Assistant Examiner* — Lester III Rushin
(74) *Attorney, Agent, or Firm* — Alston & Bird LLP (57) ABSTRACT

A sortation conveyor is provided that can include a switch assembly that includes a switch plate, a divert plate, and a bridge plate. The switch plate includes a switch member that defines a switch guide path and a switch that can be mounted on the switch member. Further, the divert plate includes a divert member that defines a divert guide path on a first side and a non-divert guide path on a second side of the divert member. Furthermore, the bridge plate includes a bridge member that defines a first bridge guide path and a second bridge guide path. In some examples, the bridge plate is positioned between the switch plate and the divert plate so that the first bridge guide path connects the switch guide path to the divert guide path and the second bridge guide path connects the switch guide path to the non-divert guide path.

20 Claims, 6 Drawing Sheets

FIG. 6

SWITCH ASSEMBLY OF A SORTATION CONVEYOR

TECHNOLOGICAL FIELD

Example embodiments described herein relate generally to a sortation conveyor for diverting articles to a divert location from the conveyor, and, more particularly, to a switch assembly of the sortation conveyor.

BACKGROUND

Generally, in material handling environments like, but not limited to, distribution centers, warehouses, inventories, or shipping centers, a material handling system, can convey, handle, sort, and organize various type of articles (e.g. items, cartons, cases, containers, shipment boxes, totes, packages, and/or the like) at high speeds on a conveyor.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a sortation conveyor that comprises a switch assembly. The switch assembly can comprise a switch plate, a divert plate, and a bridge plate. In this regard, the switch plate can comprise a switch member that can define a switch guide path and a switch that can be mounted on the switch member. Further, the divert plate can comprise a divert member that can define a divert guide path on a first side and a non-divert guide path on a second side of the divert member. Furthermore, the bridge plate can comprise a bridge member that can define a first bridge guide path and a second bridge guide path. In some examples, the bridge plate can be positioned between the switch plate and the divert plate so that the first bridge guide path connects the switch guide path to the divert guide path and the second bridge guide path connects the switch guide path to the non-divert guide path.

In some example embodiments, the sortation conveyor can comprise a pusher shoe with a pusher pin. In this regard, the switch guide path, the divert guide path, the non-divert guide path, the first bridge path, and the second bridge path of the switch assembly can be adapted to support the movement of the pusher pin within the respective paths.

In some example embodiments, the switch guide path can comprise an entry section, a portion defined by the rotatable switch, and a divert section. According to some example embodiments, the switch assembly can define a first path for movement of a pusher pin of a pusher shoe to divert the articles. In this regard, the first path can comprise, the entry section and the divert section of the switch guide path, the first bridge guide path, the first divert guide path, and a divert track path of a divert guide track that can be positioned downstream of the switch assembly. In some example embodiments, the switch assembly can define a second path for movement of a pusher pin of a pusher shoe. In this regard, the second path can comprise, the entry section and a non-divert section of the switch guide path, the second bridge path, and the non-divert guide path defined by the divert member of the divert plate. To this end, in accordance with some example embodiments, the switch of the switch plate of the switch assembly can be configured to be moved in a first position to enable movement of the pusher pin in the first path. Further, the switch can be configured to be moved in a second position to enable movement of the pusher pin in the second path.

According to some example embodiments, the sortation conveyor comprises a divert guide track that can be disposed of downstream of the switch assembly. In some examples, the divert guide track can define a divert track path comprising a straight section and an arcuate section.

According to some example embodiments, the sortation conveyor can further comprise a conveyor frame comprising a first side frame, a second side frame, a spreader mounted between the first side frame and the second side frame, and a guide rail mounted on the spreader. In this regard, the switch plate, the bridge plate, and the divert plate can be mounted on the guide rail. Further, in some example embodiments, the bridge plate is mounted on the guide rail over the spreader and positioned downstream of the switch plate comprising an actuator unit to avoid interference with the spreader.

According to some example embodiments, the sortation conveyor can comprise comprising a first spreader, a second spreader, and a third spreader. In this regard, in some examples, the switch assembly can comprise, the switch plate mounted between the first spreader and the second spreader, the bridge plate mounted over the second spreader, and the divert plate is mounted between the second spreader and the third spreader.

Some example embodiments described herein relate to a switch assembly of a sortation conveyor. The switch assembly comprises a switch plate comprising a switch member that defines a switch guide path. Further, the switch assembly comprises a divert plate comprising a divert member that defines a divert guide path on a first side of the divert member and a non-divert guide path on a second side of the divert member. Furthermore, the switch assembly comprises a bridge plate positioned between the switch plate and the divert plate. The bridge plate comprises a bridge member that defines a first bridge guide path on a first side of the bridge member and a second bridge guide path on the second side of the bridge member.

In some example embodiments, the first bridge path connects the switch guide path with the divert guide path and the second bridge path connects the switch guide path with the non-divert guide path.

According to some example embodiments, the switch guide path, the divert guide path, the non-divert guide path, the first bridge path, and the second bridge path defined by the switch assembly can be adapted to support the movement of a pusher pin of a pusher shoe within the respective paths.

According to some example embodiments, the switch guide path defined by the switch member of the switch plate can comprise an entry section, a surface defined by a switch, a divert section, and a non-divert section. In this regard, in some example embodiments, the switch assembly can define a first path for movement of a pusher pin of a pusher shoe to divert articles from a sortation conveyor. To this end, the first path can comprise the entry section and the divert section defined by the switch member, the first bridge guide path defined by the bridge member, the first divert guide path defined by the divert member, and a divert track path of a divert guide track. Further, in some example embodiments, the switch assembly can define a second path for movement of a pusher pin of a pusher shoe. In this regard, the second path can comprise, the entry section and the non-divert section defined by the switch member, the second bridge path defined by the bridge member, and a non-divert guide path of the divert member.

Some example embodiments described herein relate to bridge plate configured to be positioned between a switch plate and a divert plate of a switch assembly of a sortation conveyor. In this regard, the bridge plate can comprise a bridge member defined on a top surface of the bridge plate. Further, the bridge plate can comprise, a first bridge path defined by a first side of the bridge member and a first portion of the top surface. In this regard, the first bridge path connects a switch guide path defined by the switch plate and a divert guide path defined by the divert plate. Furthermore, the bridge plate can comprise a second bridge path defined by a second side of the bridge member and a second portion of the top surface. In this regard, the second bridge path connects the switch guide path with a non-divert path of the divert plate.

In some example embodiments, the bridge plate can be configured to be mounted on a guide rail of a conveyor frame of the sortation conveyor. In this regard, in some example embodiments, the bridge plate can be mounted on the guide rail over a spreader of the conveyor frame and between the switch plate and the divert plate mounted on the guide rail.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

In some examples, conveyors can include a roller conveyor bed, or a conveyor belt mounted between two sides of a conveyor frame. In some examples, the conveyor can correspond to a sortation conveyor (e.g., but not limited to, a shoe sorter) that can be configured for sorting articles based on selective diverting of the articles on the conveyor into respective divert lanes. In some examples, shoe sorters can include a switch assembly configured to selectively direct a shoe pusher from a home path to a divert path for diverting articles. Usually, the switch assembly is mounted on a conveyor frame of a sortation conveyor. Mounting switch assembly on the conveyor frame of the sortation conveyor has associated challenges and limitations.

Various example embodiments described herein relate to a sortation conveyor comprising one or more pusher shoes that can travel laterally (i.e. transverse to a longitudinal direction of travel of a conveyor surface of the sortation conveyor) to divert articles carried by the conveyor surface of the sortation conveyor to divert locations associated with the sortation conveyor. In this regard, in some examples, the pusher shoes can be guided along divert guide paths so as to gently engage and gradually accelerate conveyed articles laterally onto divert units mechanically coupled to the sortation conveyor.

For instance, in some examples, the sortation conveyor and the switch assembly referred hereinafter at multiple instances throughout the description can correspond to the sortation conveyor comprising components that can operate based on some techniques as described in U.S. patent application Ser. No. 12/014,822, entitled, "Sortation Conveyor", filed 16 Jan. 2008, details of which are incorporated herein by reference.

Typically, such sortation conveyors include a divert unit having a divert guide path and a switch assembly that can be mounted upstream of the divert guide path on a conveyor frame of the sortation conveyor. The divert guide path referred herein, comprises an arcuate section that offers a path for movement of a pusher pin of the pusher shoe, so that a shoe face of the pusher shoe gently makes a contact on an article conveyed on the sortation conveyor to guide the article on the divert guide path. In this aspect, the switch assembly includes a switch that can be moved between two positions (e.g. a first position or a second position) to selectively divert one or more pusher shoes from a home path to the divert guide path of the divert unit. Said that, usually, mounting the switch assembly on the conveyor frame of the sortation conveyor has associated challenges. For instance, in some examples, the switch assembly can be mounted on a portion of the conveyor frame (e.g. a side frame or on a spreader of the conveyor frame). In this regard, generally it is desired to install a divert unit (i.e. both switch assembly and the divert guide path) on the conveyor frame so that a distal end of the divert path aligns to a divert lane connected to the sortation conveyor. In such cases, to meet such installation requirements, sometimes, mounting the switch assembly on the conveyor frame becomes challenging due to an interference caused by one or more components of the switch assembly with one or more spreaders of the conveyor frame. This often leads to re-designing the switch assembly (e.g. switch plate or divert plate) of the switch assembly or the divert unit (i.e. both the switch assembly and the divert guide path) itself to meet installation requirements as per a customer's material handling site.

Various example embodiments described herein relate to a sortation conveyor with an improved design of switch assembly that can be installed on the conveyor frame of the sortation conveyor. The switch assembly is designed and configured so as to, (a) avoid any interference of components of switch assembly (e.g. actuator unit) with spreaders of the conveyor frame, (b) support a use of existing divert unit design that can be customized based on a customer's material handling site, and (c) selectively divert the pusher shoes thereby causing a desired impact (e.g. hard touch or soft touch) by a shoe face of the pusher shoe onto the articles.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Figure 1:
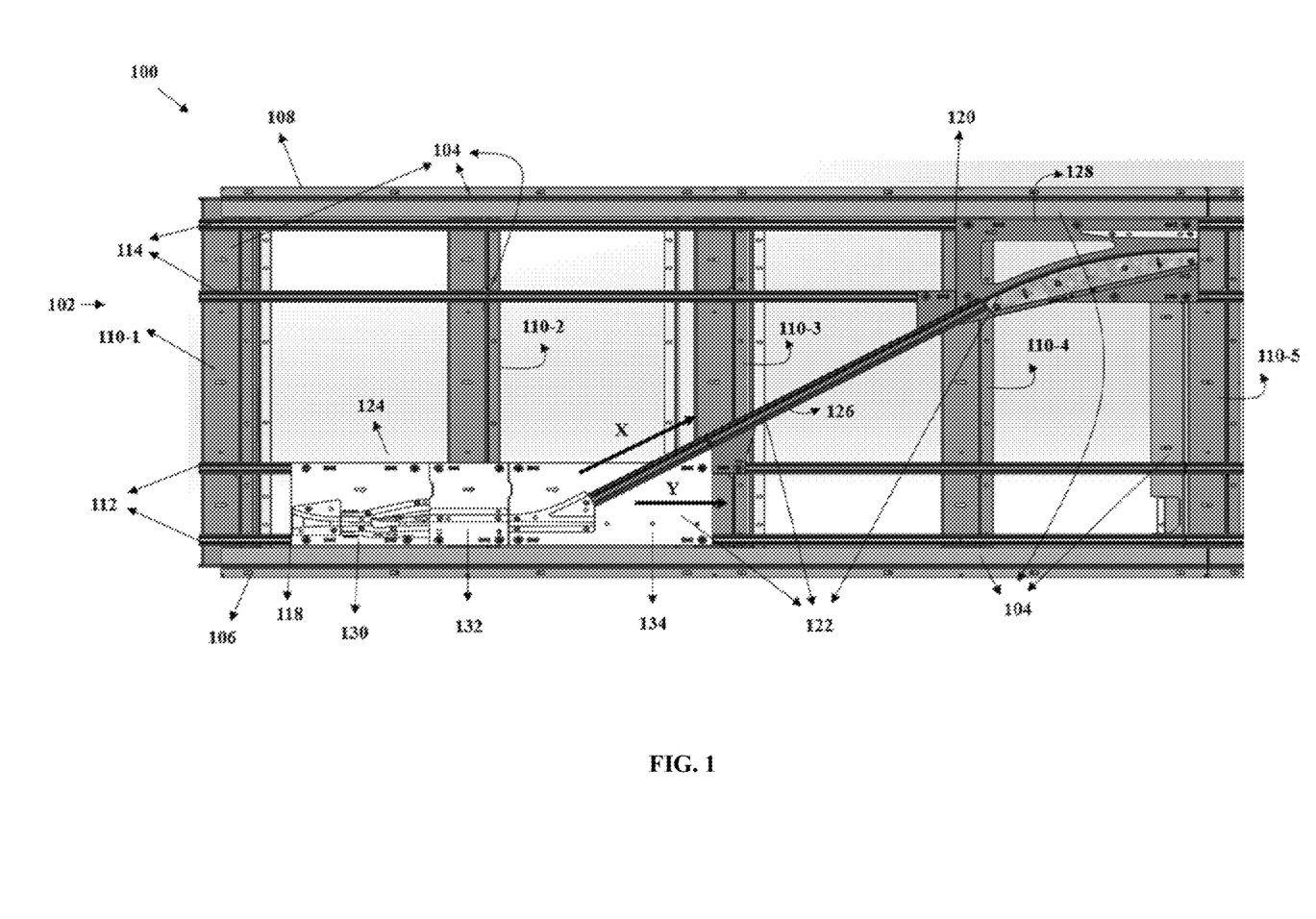
FIG. 1 illustrates a top view of a sortation conveyor comprising a switch assembly, in accordance with some example embodiments described herein.

FIG. 1 illustrates a perspective view 100 of a sortation conveyor 102 of a material handling environment. According to some example embodiments, the sortation conveyor 102 can comprise a conveyor frame 104 defined by a first side frame 106, a second side frame 108, and one or more spreaders 110-1, 110-2, 110-3, 110-4, 110-5 . . . 110-*n* mounted between the first side frame 106 and the second side frame 108. According to some example embodiments, the sortation conveyor 102 can correspond to a conveyor configured for sorting one or more articles in the material handling environment.

Illustratively, the sortation conveyor 102 can comprise one or more guide rails, e.g. a first guide rail 112 and a second guide rail 114 (collectively referred hereinafter as, guide rails 112 and 114 for purpose of brevity) that can be mounted on the conveyor frame 104. In this regard, the one or more spreaders 110-1, 110-2, 110-3, 110-4, 110-5 . . . 110-*n* of the conveyor frame 104 can support mounting of the guide rails 112 and 114. As illustrated, according to some example embodiments, the guide rails 112 and 114 of the sortation conveyor 102 can run substantially parallel to the side frames 106 and 108 and along a length of the sortation conveyor 102.

In accordance with various example embodiments described herein, the sortation conveyor 102 can comprise a divert unit 122 that can be configured for diverting one or more articles from the sortation conveyor 102 to a divert lane. To this end, in accordance with some example embodiments, the divert unit 122 can comprise at least three components i.e. (i) a switch assembly 124, (ii) a divert guide track 126 positioned downstream of the switch assembly 124, and (iii) a divert end plate 128 positioned downstream of the divert guide track 126. In accordance with various example embodiments, the divert unit 122 can be configured to cause movement of one or more pusher shoes of the sortation conveyor 102 to divert one or more articles on the sortation conveyor 102, details of which are described hereinafter. Illustratively, in accordance with some example embodiments described herein, the divert unit 122 can be mounted on the guide rails 112 and 114 of the sortation conveyor 102. Said differently, the guide rails 112 and 114 can be configured to support mounting of the divert unit 122 between two ends (i.e. a first end 118 and a second end 120) of the sortation conveyor 102.

In some example embodiments, the divert unit 122 can be engaged over the guide rails 112 and 114. Further, the divert unit 122 can be configured to be slidably moved on the guide rails 112 and 114 to various positions along a length of the sortation conveyor 102. Said differently, the divert unit 122 can be moved in the direction Y to adjust a positioning of the divert unit 122 relative to a divert lane/divert spur connected with the sortation conveyor 102 and can subsequently be fixedly mounted on the guide rails 112 and 114. For instance, in some example embodiments, the divert unit 122 can be slidably moved to a desired position on the guide rails 112 and 114 so as to align a distal end (i.e. the second end 114) of the divert unit 122 to an entry section of the divert lane (not shown) associated with the sortation conveyor 102. Accordingly, the divert unit 122 can be slidably moved and can be positioned upstream of the divert lane (not shown) so that the second end 114 of the divert unit 122 interfaces with the divert lane on the sortation conveyor 102. It may be understood that for positioning the divert lane and the divert unit 122 on the sortation conveyor 102 consideration may also be given to layout of a material handling environment within which the sortation conveyor 102 is to be installed. Accordingly, upon positioning the divert unit 122 at the desired position, and the divert unit 122 can furthermore be fixedly mounted on the guide rails 112 and 114.

Illustratively, in accordance with some example embodiments, the divert unit 122 of the sortation conveyor 102 can comprise the switch assembly 124 mounted on the guide rails 112. The switch assembly 124 can comprise a switch plate 130, a bridge plate 132, and a divert plate 134. In this regard, in some example embodiments, the bridge plate 132 can be positioned between the switch plate 130 and the divert plate 134. Said differently, the bridge plate 132 is placed between the switch plate 130 and the divert plate 134 over the guide rails 112 so that one or more paths defined by the switch plate 130 and the divert plate 134 respectively, are joined by a path defined by the bridge plate 132 for movement of pusher shoes. Further, as illustrated, while the switch plate 130 is mounted on the guide rails 112 between two adjacent spreaders (110-1 and 110-2), the divert plate 134 is mounted on the guide rails 112 between two adjacent spreaders (110-2 and 110-3), the bridge plate 132 is mounted on the guide rails 112 over the spreader 110-2 of the conveyor frame 104. Mounting the bridge plate 132 over the spreader 110-2 can avoid interfering with one or more components of the switch plate 130 with the spreader 110-2, details of which are described in reference to FIG. 5.

According to various example embodiments described herein, the switch plate 130 can comprise a switch member (not shown), the bridge plate 132 can comprise a bridge member (not shown), and the divert plate 134 can comprise a divert member (not shown). In this regard, the switch member, the bridge member, and the divert member can define a switch guide path, a bridge guide path, and a divert guide path, respectively, for movement of a pusher pin of the pusher shoe within these paths and further to a divert track path defined by the divert guide track 126. Details of the switch member, the bridge member, and the divert member are further described in reference to FIG. 2. Further, in accordance with some example embodiments described herein, the switch plate 130 can comprise a switch that can be actuated by an actuator unit and can be moved between two positions (e.g. a first position or a second position) for selectively diverting the pusher shoe from a home path X to the divert guide path Y of the divert unit 122, details of which would be described in reference to FIG. 2.

Figure 2:
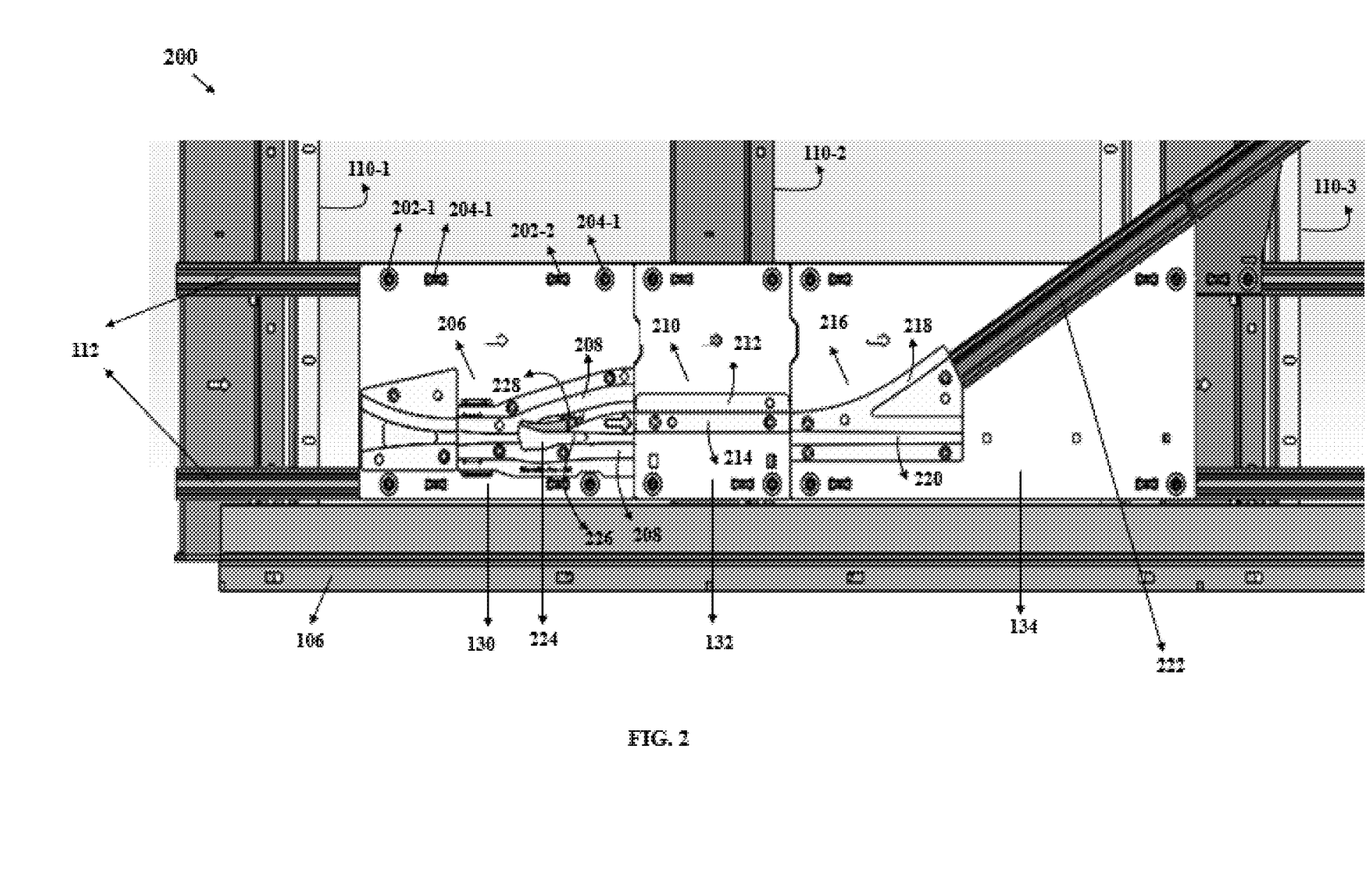
FIG. 2 illustrates a top view of the switch assembly of the sortation conveyor, in accordance with some example embodiments described herein.

FIG. 2 illustrates a top view 200 of the switch assembly 124 of the sortation conveyor 102, in accordance with some example embodiments described herein. The switch assembly 124 comprises the switch plate 130, the bridge plate 132, and the divert plate 134. In some example embodiments, as illustrated and described before, the bridge plate 132 is positioned between the switch plate 130 and the divert plate 134. Further, as illustrated and described before, in some examples, the switch plate 130, the bridge plate 132, and the divert plate 134 are mounted on the guide rails 112.

In accordance with some example embodiments described herein, the switch plate 130, the bridge plate 132, and the divert plate 134 of the switch assembly 124 can be mounted on the guide rails 112 of the conveyor frame 104, based on any engagement mechanism. For instance, in some example embodiments, the switch plate 130, the bridge plate 132, and the divert plate 134 (collectively referred hereinafter, as the plates 130, 132, and 134, for purposes of brevity), can be mounted on the guide rails 112 based on an engagement mechanism comprising one or more nut and bolt assembly and alignment keys. To this end, as illustrated, the plates (130, 132, and 134) can be mounted on the guide rails 112 e.g., but not limited to, via a nut and bolt assembly (202-1, 202-2) and/or a respective alignment key (204-1, 204-2). In this regard, the alignment key (204-1, 204-2) referred herein may be adapted so as to pass through an aperture of corresponding shape that may be defined on the plates (130, 132, and 134) thereby aligning the respective plates over the guide rails. Said differently, the alignment key (204-1, 204-2) can be plugged into a portion defined between the apertures on the plates (130, 132, 134) and cavity defined on the guide rails 112, thereby aligning the plates (130, 132, and 134) on the guide rails 112. Further, upon alignment of the plates (130, 132, and 134) of the switch assembly 124 on the guide rails 112, the plates (130, 132, and 134) can be mounted on the guide rails 112 based on fastening of the bolts of the nut and bolt assembly (202-1, 202-2), thereby fixedly engaging the switch plate 130, the bridge plate 132, and the divert plate 134 on the guide rails 112. In alternate example embodiments, other engagement mechanisms (for example, but not limited to, snap fit engagement features) can be used for mounting the plates (130, 132, and 134) on the guide rails 112.

In accordance with various example embodiments described herein, the switch plate 130 of the switch assembly 124 can comprise a switch member 206. The switch member 206 can define a switch guide path 208 for movement of a pusher pin of the pusher shoe. Further, the bridge plate 132 can comprise a bridge member 210. In this regard, the bridge member 210 can define a first bridge guide path 212 on a first side of the bridge member 210 and a second bridge guide path 214 on a second side of the bridge member 210. Further, as illustrated, the divert plate 134 can comprise a divert member 216. The divert member 216 can comprise a divert guide path 218 and a non-divert guide path 220. In accordance with various example embodiments described herein, the bridge plate 132 is positioned between the switch plate 130 and the divert plate 134 so that: (a) the first bridge guide path 212 of the bridge plate 132 connects the switch guide path 208 of the switch plate 130 with the divert guide path 218 of the divert plate 134 and (b) the second bridge guide path 214 of the bridge plate 132 connects the switch guide path 208 of the switch plate 130 with the non-divert guide path 220 of the divert plate 134. Further details of the switch member 206, the switch guide path 208, the bridge member 210, the first bridge guide path 212, the second bridge guide path 214, the divert member 216, the divert guide path 218, and the non-divert guide path 220 are described in reference to FIG. 3. As illustrated, the sortation conveyor 102 can also comprise a divert guide track 222 that can be disposed of downstream of the switch assembly 124. In this regard, the divert guide track 222 can define a divert track path comprising a straight section and an arcuate section details of which are described in reference to FIG. 6.

FIG. 2 also illustrates, spreaders of the sortation conveyor 102. Illustratively, the conveyor frame 104 of the sortation conveyor 102 comprises a first spreader 110-1, a second spreader 110-2, and a third spreader 110-3. In this regard, in accordance with various example embodiments described herein, the switch plate 130 can be mounted on the guide rails 112 between the first spreader 110-1 and the second spreader 110-2. Further, the bridge plate 132 can be mounted on the guide rails 112 over the second spreader 110-2 and the divert plate 134 can be mounted between the second spreader 110-2 and the third spreader 110-3. In accordance with some example embodiments, mounting the bridge plate 132 between the switch plate 130 and the divert plate 134 and over the second spreader 110-2 avoids an interference that would have been caused by the actuator unit and/or other components of the switch plate 130 with the second spreader 110-2, when mounting the switch assembly 124. To this end, it may be understood, the bridge plate 132 operates as a jump plate between the two plates, i.e. the switch plate 130 and the divert plate 134 to avoid interference of components of the switch plate 130 with the spreaders (110-1, 110-2, 110-3) of the sortation conveyor 102 are described in reference to FIG. 5.

As illustrated, the switch plate 206 can also comprise a switch 224 that can be configured to be rotatably moved into a first position 226 or to a second position 228 on the switch member 206. In this regard, in some examples, in response to actuation, the switch 224 can be rotated to be moved to the first position 226 so as to enable movement of the pusher pin into a first path defined by the switch guide path 208, the first bridge guide path 212, and the divert guide path 218. Alternatively, in some examples, in response to actuation, the switch 224 can be rotated to be moved to the second position 228, to enable movement of the pusher pin into a second path defined by the switch guide path 208, the second bridge guide path 214, and the non-divert guide path 220.

Figure 3:
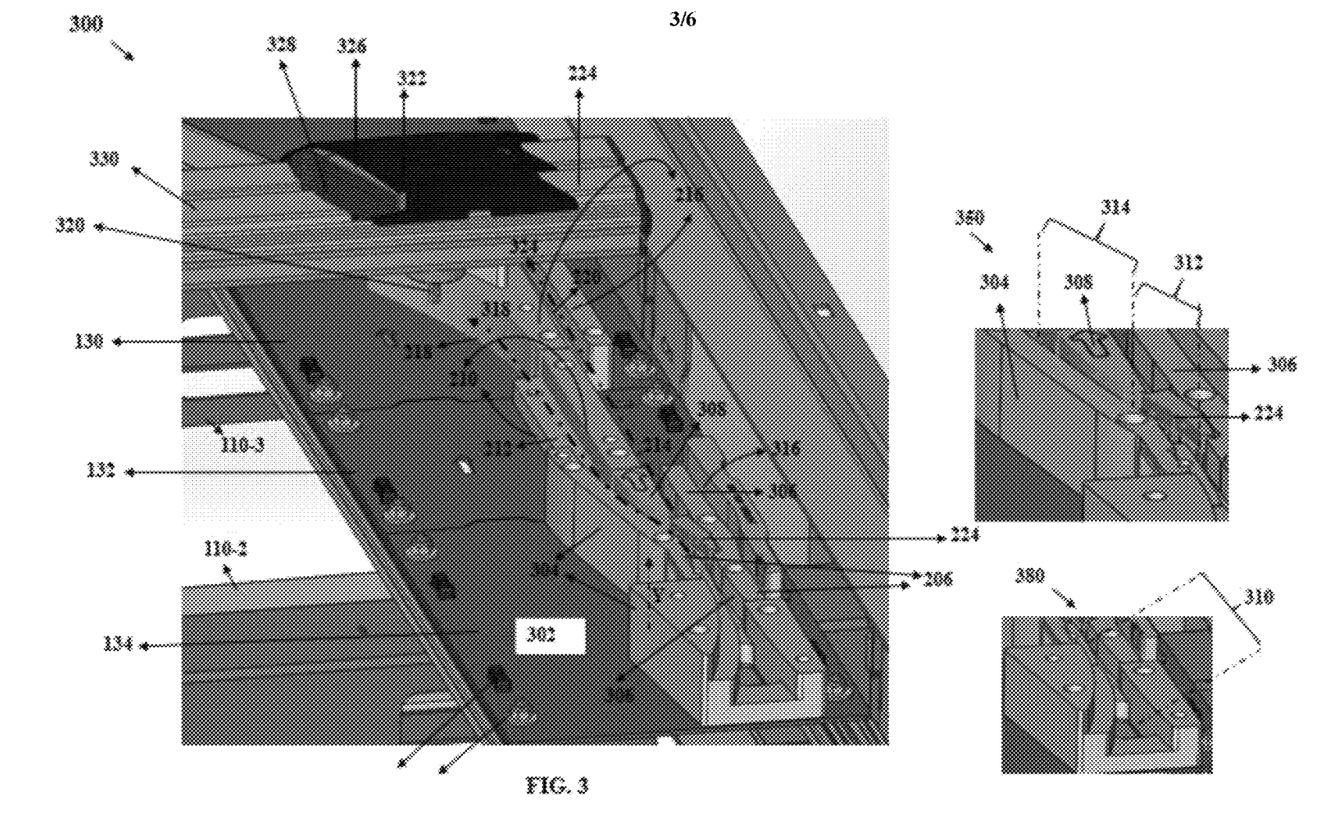
FIG. 3 illustrates a perspective view of the switch assembly of the sortation conveyor, in accordance with some example embodiments described herein.
Figure 4:
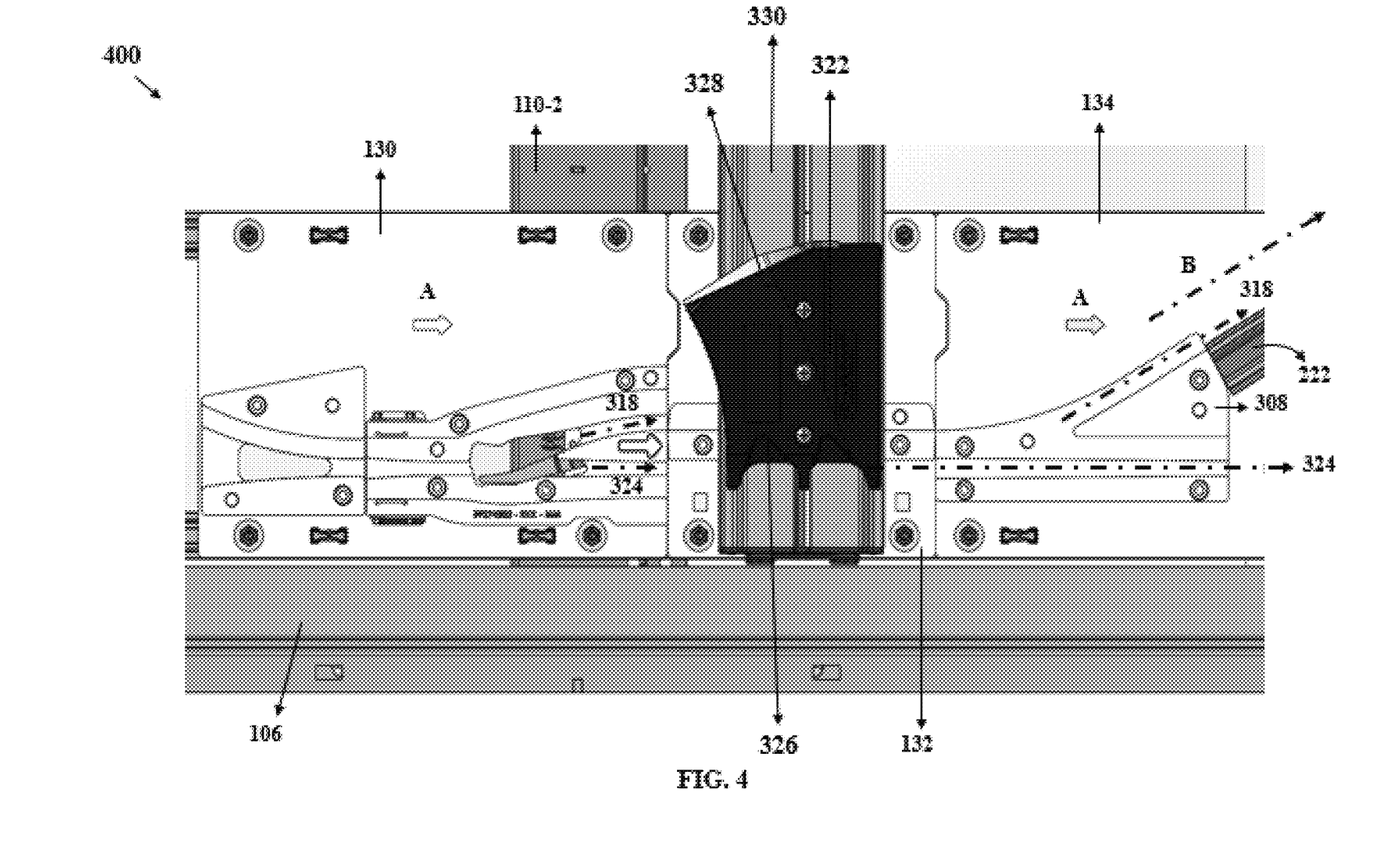
FIG. 4 illustrates a top view of the switch assembly and a pusher shoe positioned in a bridge path defined by a bridge block of the switch assembly, in accordance with some example embodiments described herein.

Further details of the movement of the pusher pin through the paths defined by the switch member 206, the bridge member 210, and the divert member 216 are described in reference to FIGS. 3-4.

Moving to FIG. 3 a perspective view 300 of the switch assembly 124 of the sortation conveyor 102 is illustrated. Illustratively, the switch assembly 124 includes the switch plate 130 defining the switch member 206. Further, the switch assembly 124 includes the bridge plate 132 defining the bridge member 210. Further, the switch assembly 124 includes the divert plate 134 defining the divert member 216. In this regard, the switch member 206, the bridge member 210, and the divert member 216 can correspond to structure, for example to, manufactured based on computerized numerical control (CNC) machined engineering parts created from castings or extrusions of a material defined by metal casted molds or molded elements that protrudes outwards from a top surface 302 of the respective plates (130, 132, and 134) in a direction Y.

Referring to zoomed in view 350 of the switch member 206, illustratively, the switch member 206 comprises a left member 304, a mid-member 308, and a right member 306. In this regard, the switch guide path 208 can be defined by the portions between the left member 304, the mid-wall member 308, and the right member 306. Further, in accordance with various example embodiments described herein, referring to the zoomed in views 350 and 380 of the switch plate 130, the switch guide path 208 defined by the switch member 206 can comprise (i) an entry section 310, (ii) a portion 312 defined by the switch 224, and (iii) a divert section 314. To this end, the divert section 314 of the switch guide path 208 is defined between the left member 304 and the mid-member 308. Further, the switch guide path 208 also comprises a non-divert section 316 defined between the mid member 308 and the right member 306.

In accordance with various example embodiments described herein, as illustrated in FIGS. 2 and 3, the switch assembly 124 comprises the bridge member 210 defined on the top surface 302 of the bridge plate 132. In this regard, the bridge member 210 defines the first bridge path 212 by a first side of the bridge member 210 (e.g. left side of the bridge member 210) and a first portion of the top surface 302 which is on the first side of the bridge member 210. Further, the bridge member 210 also defines the second bridge path 214 on a second side of the bridge member 210 (e.g. right side of the bridge member 210) and a second portion of the top surface 302 which is on the second side of the bridge member 210. Furthermore, as illustrated in FIGS. 2 and 3, the divert plate 134 of the switch assembly 124 comprises the divert member 216 that defines the divert path 218 and the non-divert path 220.

In some example embodiments, the pusher pin 320 of the pusher shoe 322 be initially housed (i.e. before an actuation) into a home position of the switch guide path 208 of the switch plate 130. However, in response to actuation, the pusher pin 320 may initiate its movement onto one or more paths defined by the switch assembly 124 to cause diverting of the articles from the sortation conveyor 102.

In accordance with various example embodiments described herein, the switch assembly 124 defines a first path 318 for movement of a pusher pin 320 of a pusher shoe 322. In this regard, movement of the pusher pin 320 along the first path 318 can cause diversion of one or more articles on the sortation conveyor 102 to a divert location (e.g. a divert lane connected to the sortation conveyor 102). Illustratively, the first path 318 comprises: (a) the entry section 310, the portion 312, and the divert section 314 of the switch guide path 208 defined by the switch member 206, (b) the first bridge guide path 212 defined by the bridge member 210, (c) the divert guide path 218 defined by the divert member 216, and a divert track path (not shown) of a divert guide track (not shown) positioned downstream of the switch assembly 124.

Further, in some example embodiments, the switch assembly defines a second path 324 for the movement of the pusher pin 320 in case diverting of an article is not desired. Illustratively, the second path 324 comprises: (a) the entry section 310 and the non-divert section 316 defined by the switch member 206, (b) the second bridge path 214 defined by the bridge member 210, and (c) a non-divert guide path 220 of the divert member 216. In this regard, in some examples, the pusher pin 320 can move along the second path 324 in case of non-diverting of one or more articles of the sortation conveyor 102. Further details of paths (i.e. the first path 318 and the second path 324) for the movement of the pusher pin 320 are described in reference to FIGS. 4-6.

FIG. 4 illustrates a top view 400 of the switch assembly 102 of the sortation conveyor 102, in accordance with some example embodiments described herein. The top view 400 also illustrated, the pusher shoe 322 positioned in the first bridge path 212 defined by the bridge plate 132 of the switch assembly 124.

In accordance with some example embodiments described herein, the sortation conveyor 102 may correspond to a slat shoe sortation conveyor comprising plurality of slats (e.g. a slat 330) mounted on between two side frames (e.g. the first side frame 106 and the second side frame 108) of the sortation conveyor 102. In this regard, in accordance with some example embodiments, the plurality of slats (or transverse slats) of the sortation conveyor 102 can be typically arranged parallel to each other and perpendicular to a direction of travel.

In some examples, these transverse slats are typically carried at each end by a moving element, such as an endless chain that can include alternately disposed extended pins which engage the slats, directly or indirectly to carry them. Said that, in accordance with some example embodiments, a plurality of pusher shoes of the sortation conveyor 102 can travel laterally (relative to the direction of travel of the sortation conveyor) about the slats to divert articles carried by an upper surface of the sortation conveyor 102 to divert spurs. In accordance with some example embodiments, the sortation conveyor 102 having the plurality of slates can correspond to sortation conveyor that can operate based on some techniques as described in U.S. patent application Ser. No. 10/409,749, entitled, "Sortation system, components and methods", filed 8 Apr. 2003, details of which are incorporated herein by reference.

Referring to FIG. 4, the top view 400 also represents the movement of the pusher pin 320 of the pusher shoe 322 along the first path 318. It may be understood, that pusher shoe 322 can correspond to an element that moves along a length of the slat laterally i.e. based on a movement of the pusher pin 320 within a path defined by the divert unit 122, as described herein through the description. To this end, the pusher shoe 322 can be interchangeably referred or known as diverter, divert element, pusher, and pusher elements. Illustratively, the pusher shoe 322 can comprise an upper element i.e. a pusher cap 326, that can be typically disposed above the upper surface of the sortation conveyor 102 so as to divert packages located thereon, a pusher pad 328 (i.e. the carried by the pusher cap 326 to contact the packages, and a pusher base (not shown) comprising the pusher pin 320 that carries the pusher cap 326 and guides it along transverse slats.

In this aspect, in an operation when the pusher shoe 322 is actuated to move along the first path 318 to divert an article, the pusher pad 328 of the pusher shoe 322 may touch onto a portion of the article thereby gently diverting the article moving in a direction A to a direction B towards a divert lane connected to the sortation conveyor 102. In accordance with some example embodiments, the engagement of the articles on the sortation conveyor 102 by the pusher shoe 322 for diverting can be performed based on some techniques as described in U.S. patent application Ser. No. 12/014,822, entitled, "Sortation conveyor", filed 16 Jan. 2008, details of which are incorporated herein by reference.

Figure 5:
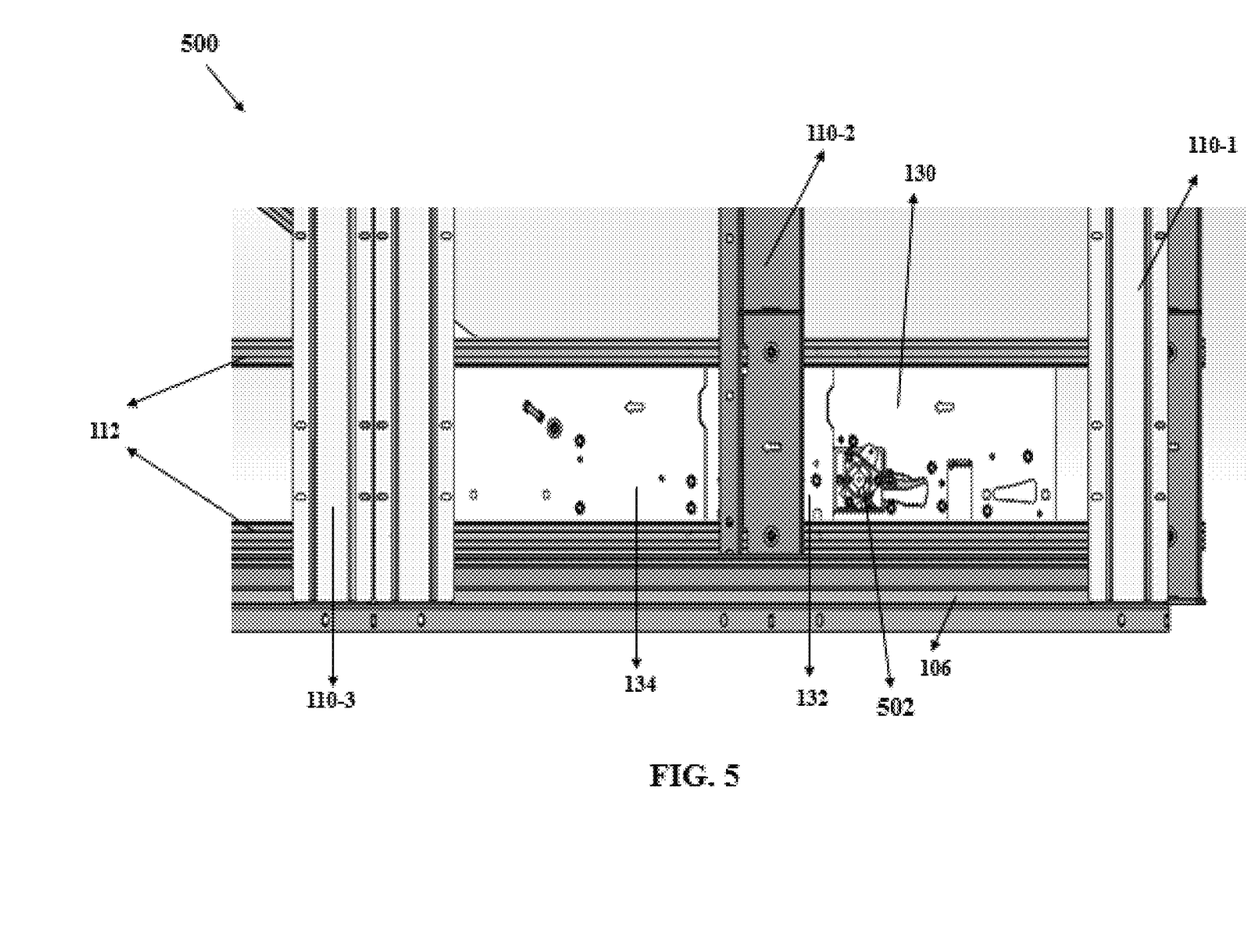
FIG. 5 illustrates a bottom view of the switch assembly, in accordance with some example embodiments described herein.

FIG. 5 illustrates a bottom view 500 of the switch assembly 124, in accordance with some example embodiments described herein. Illustratively, the bridge plate 132 is positioned between the switch plate 130 and the divert plate 134 and mounted over the spreader 110-2 thereby avoiding an interface of the components 502 (e.g. an actuator unit coupled to the switch 224 on the switch plate 130) with the spreader 110-2. Positioning the bridge plate 132 between the switch plate 130 and the divert plate 130 expands a footprint of the switch 224 (as pushing the switch 224 assembly further upstream lengthens the divert path and results in the actuator unit 502 not interfering with spreader 110-2) thereby, in case of movement of the pusher pin 320 in any path, i.e. the first path 318 or the second path 324 allows the pusher shoe 322 to exit the switch plate 130 in a direction that is parallel to direction of conveyance of the articles (i.e. the direction A).

Figure 6:
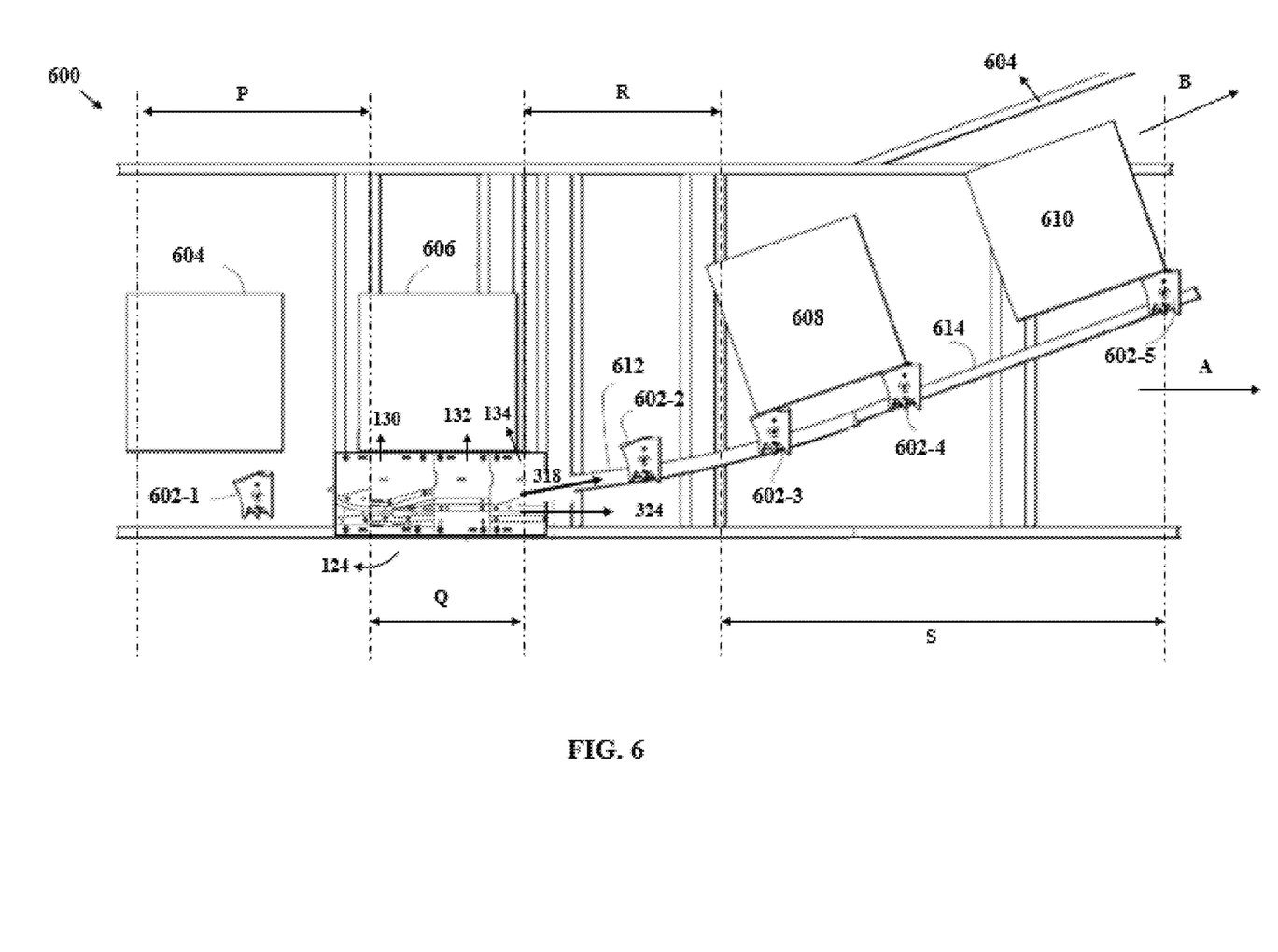
FIG. 6 illustrates an example scenario representing a movement a plurality of pusher shoes from the switch assembly to a divert guide track of the sortation conveyor and interaction between a plurality of articles and the plurality of pusher shoes at various stages during a divert, in accordance with some example embodiments described herein.

FIG. 6 illustrates an example scenario representing a movement a plurality of pusher shoes (602-1, 602-2, 602-3, 602-4, 602-5) from the switch assembly 124 to the divert guide track 126 and interaction between a plurality of articles (604-610) and the plurality of pusher shoes (602-1, 602-2, 602-3, 602-4, 602-5) at various stages during a divert, in accordance with some example embodiments described herein. In this regard, according to some example embodiments, the plurality of pusher shoes (602-1, 602-2, 602-3, 602-4, 602-5) can be of shape similar to that of the pusher shoe 322 as described in reference to FIGS. 3-4.

In accordance with some example embodiments, referring to Zone P, unless diverted into the first path 318 by the switch assembly 124, the pusher 602-1 can travel along a home path (i.e. the second path 324) downstream of the switch assembly 124. Illustratively, referring to Zones R and S, the pushers (602-2, 602-3, 602-4, and 602-5) are diverted to the first path 318. In this regard, the pusher 602-2 can travel along arcuate section 612 of the divert track 222 at a lower divert angle as compared to the pusher shoe 602-3, 602-4, and 602-5 that travels along the straight section 614 of the divert track 222. It may be understood that the sortation conveyor 102 can include additional pushers (not shown) between the plurality of pusher shoes (602-1, 602-2, 602-3, 602-4, 602-5) as well as pushers that can be located upstream and/or downstream of the sortation conveyor 102 to guide the articles (604-610) along the direction B. As illustrated, the article 608 is guided towards the direction B by the pushers 602-3 and 602-4.

In this regard, in accordance with some example embodiments described herein, the sortation conveyor 102 maintains control and diverting of the articles as the articles move on a conveying surface of the sortation conveyor 102 by ensuring that the articles when being diverted can laterally accelerate at a rate that can be sufficiently low enough to maintain control throughout the entire range of longitudinal speeds at which the sortation conveyor 102 functions. In this regard, in accordance with various example embodiments described herein, guiding of the articles into a divert path by switch assembly 124 and pusher shoes can be performed based on some techniques, as described in U.S. patent application Ser. No. 12/014,822, entitled, "Sortation conveyor", filed 16 Jan. 2008, details of which are incorporated herein by reference.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A sortation conveyor comprising:
    a conveyor frame comprising a spreader and a guide rail;
    a switch assembly comprising:
        a switch plate configured to be mounted on the guide rail, the switch plate comprising:
            a switch member that defines a switch guide path; and
            a switch configured to be mounted on the switch member;
        a divert plate configured to be mounted on the guide rail, the divert plate comprising a divert member that defines a divert guide path on a first side of the divert member and a non-divert guide path on a second side of the divert member; and
        a bridge plate configured to be mounted on the guide rail over the spreader and positioned between the switch plate and the divert plate, the bridge plate comprising:
            a bridge member that defines a first bridge guide path on a first side of the bridge member, wherein the first bridge path connects the switch guide path to the divert guide path; and a second bridge guide path on a second side of the bridge member, wherein the second bridge path connects the switch guide path to the non-divert guide path.

2. The sortation conveyor of claim 1, further comprising a pusher shoe comprising a pusher pin, wherein the switch guide path, the divert guide path, the non-divert guide path, the first bridge path, and the second bridge path of the switch assembly are adapted to support movement of the pusher pin within the respective paths.

3. The sortation conveyor of claim 1 wherein the switch guide path comprises an entry section, a portion defined by the rotatable switch, and a divert section.

4. The sortation conveyor of claim 3, wherein the switch assembly defines a first path for movement of a pusher pin of a pusher shoe to divert the articles, the first path comprising the entry section and the divert section of the switch guide path, the first bridge guide path, the first divert guide path, and a divert track path of a divert guide track positioned downstream of the switch assembly.

5. The sortation conveyor of claim 3, wherein the switch assembly defines a second path for movement of a pusher pin of a pusher shoe, the second path comprising, the entry section and a non-divert section of the switch guide path, the second bridge path, and the non-divert guide path defined by the divert member of the divert plate.

6. The sortation conveyor of claim 1, further comprising, a divert guide track disposed downstream of the switch assembly, wherein the divert guide track defines a divert track path comprising a straight section and an arcuate section.

7. The sortation conveyor of claim 4, wherein the switch is configured to be moved in a first position to enable movement of the pusher pin in the first path.

8. The sortation conveyor of claim 5, wherein the switch is configured to be moved in a second position to enable movement of the pusher pin in the second path.

9. The sortation conveyor of claim 1, wherein the conveyor frame comprises:
   a first side frame;
   a second side frame;
   the spreader configured to be mounted between the first side frame and the second side frame; and
   the guide rail configured to be mounted on the spreader.

10. The sortation conveyor of claim 9, wherein the bridge plate is configured to be positioned downstream of the switch plate comprising an actuator unit to avoid interference with the spreader.

11. The sortation conveyor of claim 1, comprising a first spreader, a second spreader, and a third spreader and wherein the switch assembly comprises:
   the switch plate mounted between the first spreader and the second spreader;
   the bridge plate mounted over the second spreader; and
   the divert plate is mounted between the second spreader and the third spreader.

12. A switch assembly of a sortation conveyor comprising:
   a switch plate comprising a switch member that defines a switch guide path;
   a divert plate comprising a divert member that defines a divert guide path on a first side of the divert member and a non-divert guide path on a second side of the divert member; and
   a bridge plate positioned between the switch plate and the divert plate, the bridge plate comprising a bridge member that defines a first bridge guide path on a first side of the bridge member and a second bridge guide path on the second side of the bridge member,
   wherein the bridge plate is configured to be mounted on a guide rail of the sortation conveyor over a spreader of the sortation conveyor.

13. The switch assembly of claim 12, wherein the first bridge path connects the switch guide path with the divert guide path and the second bridge path connects the switch guide path with the non-divert guide path.

14. The switch assembly of claim 12, wherein the switch guide path, the divert guide path, the non-divert guide path, the first bridge path, and the second bridge path are adapted to support movement of a pusher pin of a pusher shoe within the respective paths.

15. The switch assembly of claim 12, wherein the switch guide path comprises an entry section, a surface defined by a switch, a divert section, and a non-divert section.

16. The sortation conveyor of claim 15, wherein the switch assembly defines a first path for movement of a pusher pin of a pusher shoe to divert articles from a sortation conveyor, the first path comprising the entry section and the divert section defined by the switch member, the first bridge guide path defined by the bridge member, the first divert guide path defined by the divert member, and a divert track path of a divert guide track.

17. The sortation conveyor of claim 15, wherein the switch assembly defines a second path for movement of a pusher pin of a pusher shoe, the second path comprising, the entry section and the non-divert section defined by the switch member, the second bridge path defined by the bridge member, and a non-divert guide path of the divert member.

18. A bridge plate configured to be mounted over a spreader on a guide rail of a sortation conveyor and positioned between a switch plate and a divert plate of a switch assembly of the sortation conveyor, the bridge plate comprising:
   a bridge member defined on a top surface of the bridge plate;
   a first bridge path defined by a first side of the bridge member and a first portion of the top surface, wherein the first bridge path connects a switch guide path defined by the switch plate and a divert guide path defined by the divert plate; and
   a second bridge path defined by a second side of the bridge member and a second portion of the top surface, wherein the second bridge path connects the switch guide path with a non-divert path of the divert plate.

19. The bridge plate of claim 18, wherein the bridge plate is configured to be mounted on the guide rail of a conveyor frame of the sortation conveyor.

20. The bridge plate of claim 19, wherein the switch plate and the divert plate is mounted on the guide rail.

* * * * *